United States Patent
Takaki et al.

(10) Patent No.: US 7,287,700 B2
(45) Date of Patent: Oct. 30, 2007

(54) LIGHT EMITTING TIMING ADJUSTMENT METHOD, LASER SCANNING APPARATUS, AND IMAGE FORMATION APPARATUS

(75) Inventors: Kouichi Takaki, Hachioji (JP); Kenji Izumiya, Hachioji (JP); Toshihiro Motoi, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 268 days.

(21) Appl. No.: 11/195,741

(22) Filed: Aug. 3, 2005

(65) Prior Publication Data

US 2006/0244810 A1 Nov. 2, 2006

(30) Foreign Application Priority Data

Apr. 28, 2005 (JP) .............................. 2005-131573

(51) Int. Cl.
G06K 7/10 (2006.01)
(52) U.S. Cl. .............................. 235/462.42; 235/462.25
(58) Field of Classification Search ..............................
235/462.01–462.47, 472.01, 472.02, 472.03,
235/454, 455, 470
See application file for complete search history.

(56) References Cited

U.S. PATENT DOCUMENTS

| | | | |
|---|---|---|---|
| 6,172,788 B1 * | 1/2001 | Suzuki et al. ............... | 359/204 |
| 6,246,463 B1 * | 6/2001 | Hamada et al. ............... | 355/41 |
| 6,927,789 B2 * | 8/2005 | Ozasa et al. ................. | 347/249 |
| 7,009,430 B2 * | 3/2006 | Nihei et al. .................. | 327/141 |
| 2003/0025785 A1 * | 2/2003 | Nihei et al. .................. | 347/250 |
| 2004/0032482 A1 * | 2/2004 | Ozasa et al. ................. | 347/237 |
| 2004/0160508 A1 * | 8/2004 | Ono ............................ | 347/237 |
| 2005/0007443 A1 * | 1/2005 | Komiya et al. ............. | 347/255 |

FOREIGN PATENT DOCUMENTS

JP 10-221618 8/1998

* cited by examiner

*Primary Examiner*—Thien Minh Le
(74) *Attorney, Agent, or Firm*—Finnegan, Henderson, Farabow, Garrett & Dunner, L.L.P.

(57) ABSTRACT

A laser scanning apparatus includes: a plurality of laser light sources including a first laser light source and a second laser light source; a scanner for scanning laser lights emitted from the plurality of laser light sources in a main scanning direction; a light receiving sensor for receiving the laser lights deflected and scanned by the scanner; and a signal generation unit for generating a first signal which is in synchronization with a pixel clock for the second laser light source based on an output from the light receiving sensor obtained by a laser light emitted from the first laser light source, and for generating a second signal which is in synchronization with a pixel clock for the first laser light source based on an output from the light receiving sensor obtained by a laser light emitted from the second laser light source.

13 Claims, 5 Drawing Sheets

LIGHT EMITTING TIMING ADJUSTMENT METHOD, LASER SCANNING APPARATUS, AND IMAGE FORMATION APPARATUS

BACKGROUND OF THE INVENTION

1. Field of the Invention

This invention relates to: a method for adjusting the timings at which laser light sources included in an image formation apparatus emit lights; a laser scanning apparatus; and an image formation apparatus including such a laser scanning apparatus.

2. Description of the Related Art

In recent years multi-beam laser scanning apparatus in which writing is performed by emitting a plurality of beams from a semiconductor laser array having a plurality of laser light sources and simultaneously scanning a plurality of scanning lines are used in image formation apparatus, such as printers and copying machines, in order to realize high-speed processing and high resolution.

Figure 1:
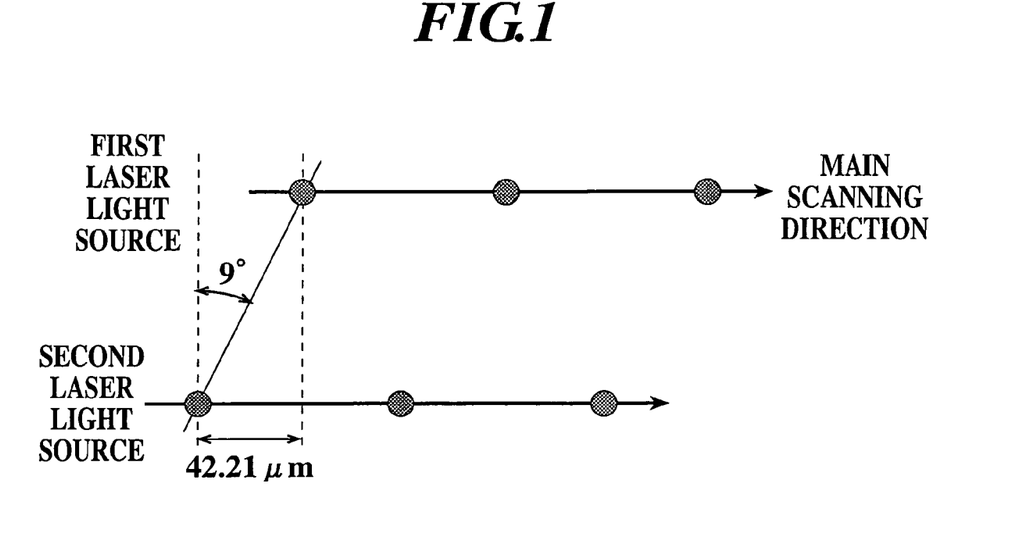
FIG. 1 is a view showing beam spots of the first laser light source and the second laser light source.

If a laser scanning apparatus having two laser light sources is used, a defective image on which lines like scratches have appeared may be printed out due to the interference of light beams emitted from these laser light sources. A method in which the two laser light sources (first laser light source and second laser light source) are placed so that they will be inclined at an angle to a sub-scanning direction is known as a means of reducing such interference. In this case, as shown in FIG. 1, there is a deviation in a main scanning direction between beam spots of the first laser light source and the second laser light source. Accordingly, the timing at which these laser light sources emit light must be controlled to correct this deviation in the main scanning direction. Such a deviation in the main scanning direction may also occur when the laser light sources are in an inclined position due to an angular error in mounting. It is assumed that the mounting angle characteristic of the laser light sources is 1°=4.7 µm. To shift an image by one pixel, an angle of 9°(=42.21 µm) is required under 600 dpi.

A technique for detecting a deviation in the main scanning direction between beam spots of laser light sources and adjusting the deviation by reading an image which is formed on a photosensitive drum or which is printed out with a sensor, is disclosed in JP-Tokukaihei-10-221618A (hereinafter referred to as "patent document 1") as such a laser scanning apparatus (multi-beam apparatus) having a plurality of laser light sources.

With the method disclosed in patent document 1, however, hardware, such as an image read sensor, is required. As a result, manufacturing costs rise. In addition, an image is formed and is then read. It takes time to perform a detection process, resulting in low processing efficiency.

SUMMARY

The present invention was made under the background circumstances described above. An object of the present invention is to electrically and accurately detect a deviation in the main scanning direction between beam spots of a plurality of laser light sources included in an image formation apparatus and to correct the deviation.

In order to solve the above problem, a light emitting timing adjustment method reflecting one embodiment of the invention is presented. In an image formation apparatus which includes a plurality of laser light sources including the first laser light source and the second laser light source, a scanner for scanning laser lights emitted from the plurality of laser light sources in a main scanning direction, and a light receiving sensor for receiving the laser lights deflected and scanned by the scanner, the method for adjusting timings at which the first laser light source and the second laser light source emit lights comprises:

a first generation process for making the first laser light source emit light in a first scanning period in which scanning is performed by the scanner, and for generating a first signal which is in synchronization with a pixel clock for the second laser light source based on an output from the light receiving sensor obtained in the first scanning period;

a second generation process for making the second laser light source emit light in a second scanning period after the first scanning period, and for generating a second signal which is in synchronization with a pixel clock for the first laser light source based on an output from the light receiving sensor obtained in the second scanning period;

a third generation process for making the second laser light source emit light in a third scanning period in which scanning is performed by the scanner, and for generating a third signal which is in synchronization with the pixel clock for the first laser light source based on an output from the light receiving sensor obtained in the third scanning period;

a fourth generation process for making the first laser light source emit light in a fourth scanning period after the third scanning period, and for generating a fourth signal which is in synchronization with the pixel clock for the second laser light source based on an output from the light receiving sensor obtained in the fourth scanning period; and an adjustment process for adjusting, based on a time interval between the first signal and the second signal and a time interval between the third signal and the fourth signal, a relationship between timings at which the first laser light source and the second laser light source emit lights.

Preferably, the second scanning period is identical to the third scanning period, and the output from the light receiving sensor obtained in the second scanning period is identical to the output from the light receiving sensor obtained in the third scanning period, thus the second signal is identical the third signal.

Preferably, each of the first generation process through the fourth generation process is performed a plurality of times; and in the adjustment process, the relationship is adjusted based on a plurality of time intervals obtained from a plurality of the first signals and a plurality of the second signals and a plurality of time intervals obtained from a plurality of the third signals and a plurality of the fourth signals.

Further, preferably, in the adjustment process, the plurality of time intervals obtained from the plurality of first signals and the plurality of second signals and the plurality of time intervals obtained from the plurality of third signals and the plurality of fourth signals are obtained based on a clock signal having a clock frequency lower than a that of the pixel clock.

Preferably, in the adjustment process, with respect to at least one of the pixel clock for the first laser light source and the pixel clock for the second laser light source, a phase thereof is adjusted.

Preferably, in the adjustment process, at least one of a number of delay clock used for beginning to write an image by using the first laser light source and a number of delay clock used for beginning to write an image by using the second laser light source is adjusted.

Preferably, the second laser light source is placed so as to be shifted in the main scanning direction in an amount of a predetermined number of pixel(s) from the first laser light source;

in the first generation process, a delay of pixel clock corresponding to the predetermined number of pixel(s) is produced when the first signal is generated based on the output from the light receiving sensor obtained in the first scanning period; and in the fourth generation process, a delay of pixel clock corresponding to the predetermined number of pixel(s) is produced when the fourth signal is generated based on the output from the light receiving sensor obtained in the fourth scanning period.

In accordance with a laser scanning apparatus reflecting one embodiment of the invention, the apparatus comprises:

a plurality of laser light sources including a first laser light source and a second laser light source;

a scanner for scanning laser lights emitted from the plurality of laser light sources in a main scanning direction;

a light receiving sensor for receiving the laser lights deflected and scanned by the scanner; and a signal generation unit for generating a first signal which is in synchronization with a pixel clock for the second laser light source based on an output from the light receiving sensor obtained by a laser light emitted from the first laser light source, and for generating a second signal which is in synchronization with a pixel clock for the first laser light source based on an output from the light receiving sensor obtained by a laser light emitted from the second laser light source.

Preferably, the apparatus further comprises a control unit for adjusting relative timing at which the first laser light source and the second laser light source emit light based on the first signal and the second signal.

Preferably, the signal generation unit:

generates the first signal based on an output from the light receiving sensor obtained by making the first laser light source emit light in a first scanning period in which scanning is performed by the scanner; and generates the second signal based on an output from the light receiving sensor obtained by making the second laser light source emit light in a second scanning period after the first scanning period.

Further, preferably, the apparatus comprises a determination unit for determining a time interval between the first signal and the second signal.

Preferably, the second laser light source is placed so that there will be a deviation of a predetermined number of pixel in the main scanning direction between positions of the first laser light source and the second laser light source; and when the signal generation unit generates the first signal, the signal generation unit produces a delay of pixel clock corresponding to the predetermined number of pixel.

In accordance with the image forming apparatus reflecting one embodiment of the invention, the apparatus includes the laser scanning apparatus.

BRIEF DESCRIPTION OF THE DRAWINGS

The present invention will become more fully understood from the detailed description given hereinafter and the accompanying drawings which are given by way of illustration only, and thus are not intended as a definition of the limits of the present invention, and wherein.

PREFERRED EMBODIMENT OF THE INVENTION

An embodiment of the present invention will now be described with reference to the drawings.

The structure of an embodiment of the present invention will be described first.

Figure 2:
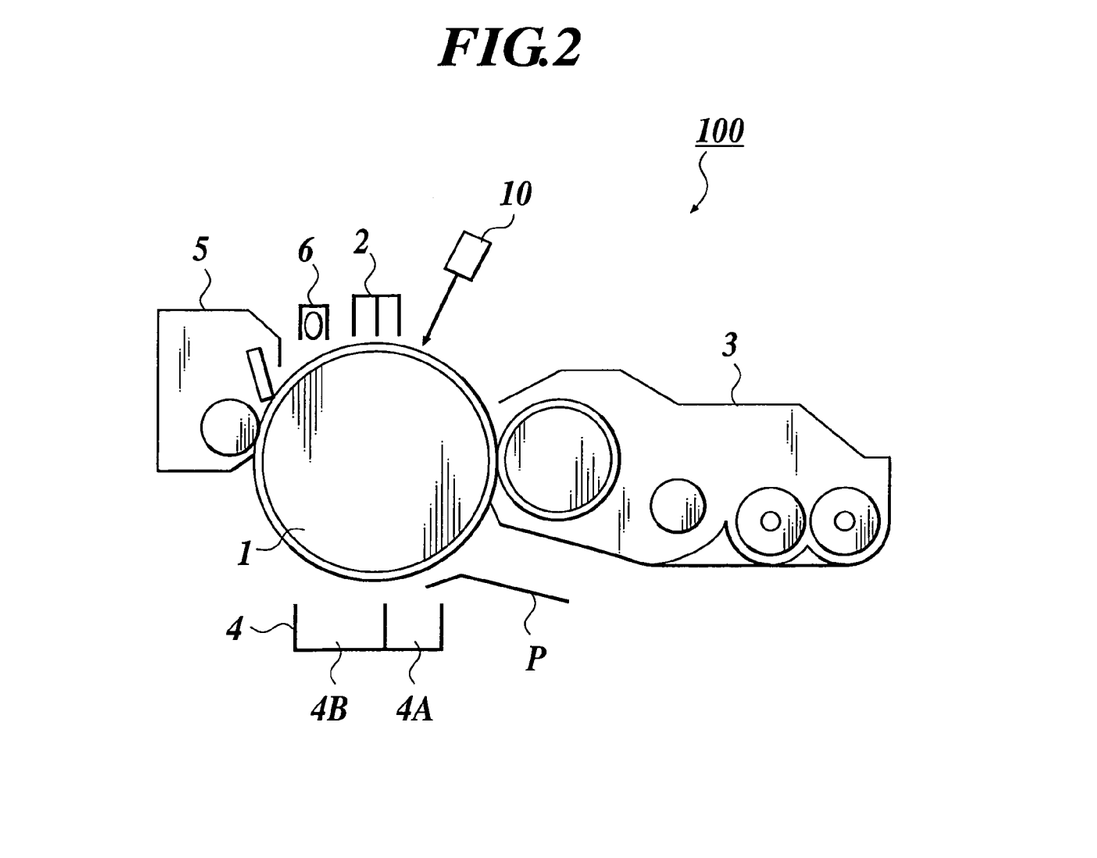
FIG. 2 is a view showing the rough structure of an image formation apparatus according to an embodiment of the present invention.

FIG. 2 is a sectional view showing the schematic structure of an image formation apparatus 100 according to an embodiment of the present invention. The image formation apparatus 100 is a copying machine, a printer, or the like and comprises an exposure unit 10 for forming an electrostatic latent image by scanning laser lights on a photosensitive drum 1, the photosensitive drum 1, a charging unit 2 for charging the photosensitive drum 1, a development unit 3 for adhering toner to the photosensitive drum 1, a transfer unit 4, a cleaner 5 for removing residual toner on the surface of the photosensitive drum 1, and a charge neutralization unit 6 for neutralizing the surface of the photosensitive drum 1. The transfer unit 4 includes a transfer electrode 4A for performing transfer by charging transfer paper P and by making the transfer paper P adsorb a toner image, and a separation electrode 4B for neutralizing the transfer paper P to separate the transfer paper P from the photosensitive drum 1. In this embodiment, it is assumed that the direction in which the photosensitive drum 1 rotates is a sub-scanning direction and that the direction of the axis (the length) of the photosensitive drum 1 is a main scanning direction.

To form an image, the surface of the photosensitive drum 1 is uniformly charged first by the charging unit 2. Laser lights are emitted from the exposure unit 10 on the basis of image data read from a document by, for example, a document reader and a latent image is formed on the photosensitive drum 1. The latent image is reversely developed by the development unit 3 and a toner image is formed on the photosensitive drum 1. A transfer paper P supplied from a paper supply unit (not shown) is conveyed to a transfer position.

The transfer electrode 4A presses the transfer paper P against the development surface of the photosensitive drum 1. Accordingly, the transfer paper P is charged and the toner image on the photosensitive drum 1 adsorbs onto the transfer paper P. Transfer is performed in this way. The separation electrode 4B neutralizes the charged transfer paper P to separate the transfer paper P from the photosensitive drum 1. A fixation unit (not shown) then fixes the toner image on the transfer paper P by heating and pressurizing the transfer paper P. The transfer paper P is delivered by delivery rollers. The cleaner 5 removes residual toner on the photosensitive drum 1. The charge neutralization unit 6 neutralizes the photosensitive drum 1 to make its surface uniform. As a result, a series of processes for forming an image ends.

Figure 3:
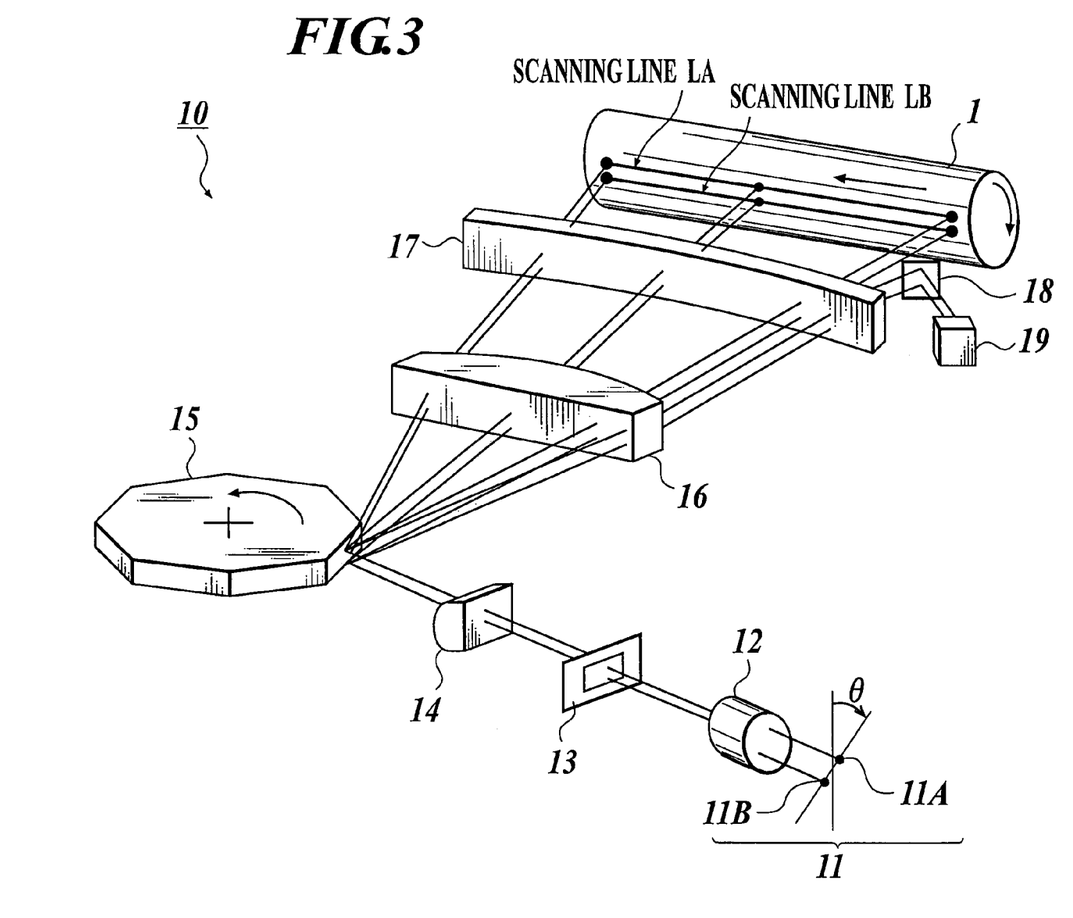
FIG. 3 is a view showing the rough structure of an exposure unit (laser scanning apparatus) included in the image formation apparatus according to the embodiment of the present invention.

FIG. 3 shows the schematic structure of the exposure unit 10. The exposure unit 10 corresponds to a laser scanning apparatus and, as shown in FIG. 3, includes a light source unit 11, a collimating lens 12, a slit 13, a cylindrical lens 14, a polygon mirror 15, an fθ lens 16, a cylindrical lens 17, a mirror 18, and a light receiving sensor 19. The light source unit 11 is a semiconductor laser unit having a first laser light source 11A and a second laser light source 11B. The direction in which these two laser light sources are arranged is at an angle θ to the sub-scanning direction. The mirror 18 and the light receiving sensor 19 are located at positions which deviate from an area on the photosensitive drum 1 where an image is to be formed.

In FIG. 1, the second laser light source 11B is shifted in the main scanning direction by one pixel (θ=9°) in respect to the first laser light source 11A. In this embodiment, however, the position in the main scanning direction of the second laser light source 11B (or the value of the inclination θ) is not restricted to this specific example. The light source unit 11 may include two semiconductor laser units each having one laser light source.

Two light beams emitted from the first laser light source 11A and the second laser light source 11B, respectively, are collimated by the collimating lens 12. The travel of the two light beams which passed through the collimating lens 12 is limited by the slit 13 for shaping a beam spot on the photosensitive drum 1. The two light beams which passed through the slit 13 are directed onto a mirror surface of the rotating polygon mirror 15 by the cylindrical lens 14 and are reflected from the mirror surface. As a result, the two light beams are deflected. The reflecting mirror surface of the polygon mirror 15 can be considered as a virtual light source. The distance from the virtual light source to the surface of the photosensitive drum 1 depends on the direction of the reflecting mirror surface, so the influence of the light beams emitted from the virtual light source on a main scanning speed is compensated for by the fθ lens 16.

The two light beams which passed through the fθ lens 16 are directed onto the photosensitive drum 1 by the cylindrical lens 17. The two light beams directed onto the photosensitive drum 1 are expressed as scanning lines LA and LB, respectively, shown in FIG. 3. As shown in FIG. 3, parts of the two light beams reflected from the polygon mirror 15 are reflected by the mirror 18. The two light beams reflected by the mirror 18 are detected by the light receiving sensor 19. The positions where exposures are begun by using the two light beams are determined on the basis of detection results. In the image formation apparatus 100 including the exposure unit 10 shown in FIG. 3, scanning exposure (main scanning) operation is performed by the rotation of the polygon mirror 15 and sub-scanning operation is performed by the rotation of the photosensitive drum 1. By doing so, a formation of entire latent image is carried out.

In FIG. 3, the polygon mirror 15 having eight mirror surfaces is used as a scanner for scanning in the main scanning direction by using the two light beams which passed through the slit 13. However, the number of mirror surfaces of the scanner is not restricted to this specific example.

Figure 4:
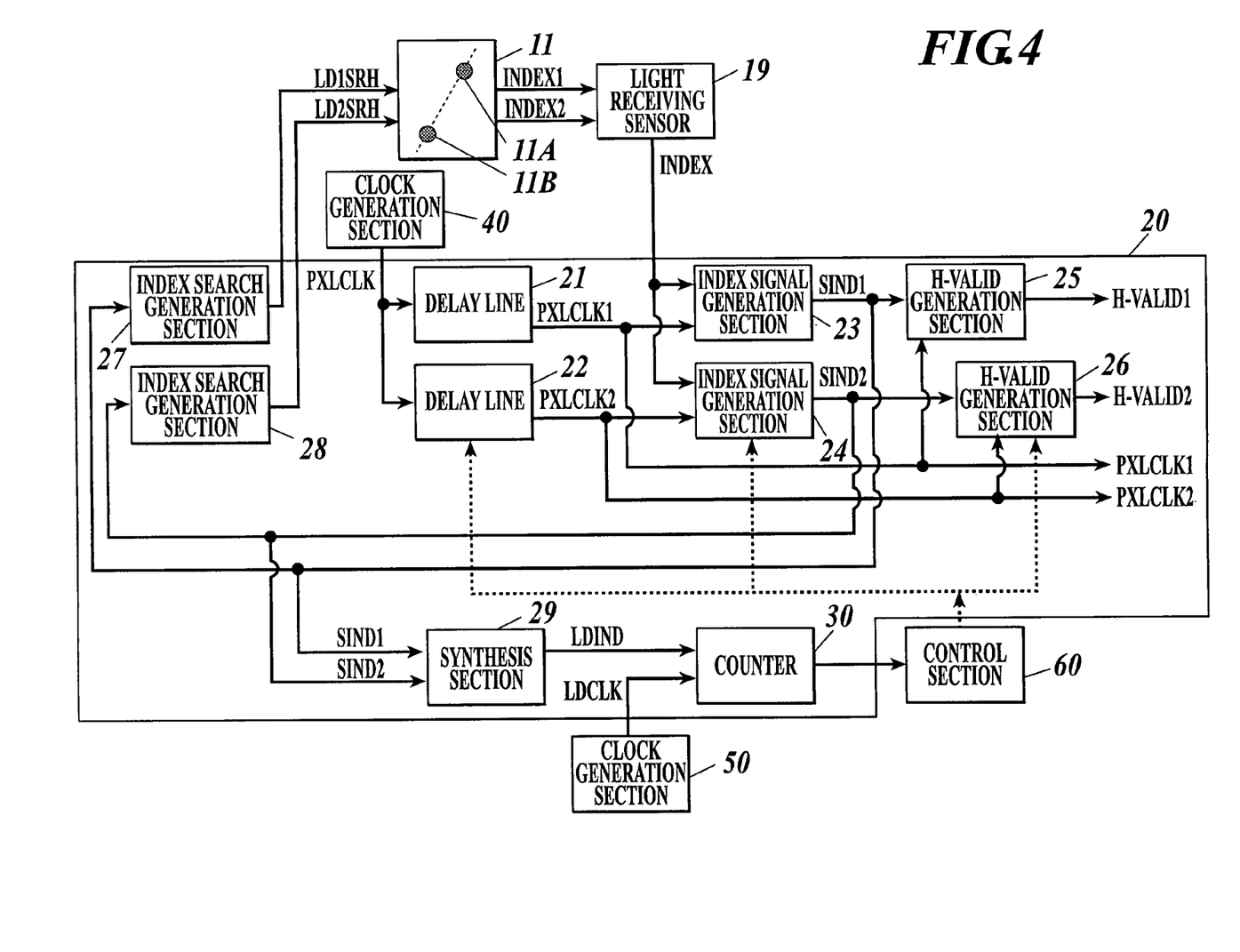
FIG. 4 is a block diagram showing the structure of a control circuit included in the exposure unit (laser scanning apparatus)

FIG. 4 shows the structure of a control circuit included in the laser scanning apparatus shown in FIG. 3. As shown in FIG. 4, this control circuit includes the light source unit 11, the light receiving sensor 19, an application specific integrated circuit (ASIC) 20, a clock generation section 40 for generating a pixel clock PXLCLK, a clock generation section 50 for generating a count clock LDCLK to be supplied to a counter 30 (described later) included in the ASIC 20, and a control section 60 for giving the ASIC 20 instructions concerning control.

The first laser light source 11A is on/off-controlled by an index search signal LD1SRH inputted and a drive signal based on image data and outputs an optical signal INDEX1. The second laser light source 11B is on/off-controlled by an index search signal LD2SRH inputted and a drive signal based on the image data and outputs an optical signal INDEX2. In this embodiment, the timing at which the second laser light source 11B emits light will be adjusted with the first laser light source 11A as a reference light source.

The light receiving sensor 19 is a photosensor called an INDEX sensor or a start-of-scan (SOS) sensor. The light receiving sensor 19 receives the optical signal INDEX1 or the optical signal INDEX2 to generate and output an index signal INDEX while its intensity is greater than a threshold. The index signal INDEX is raw output from the light receiving sensor 19 and is not in synchronization with a pixel clock PXLCLK1 or PXLCLK2 described later.

The ASIC 20 includes delay lines 21 and 22, INDEX signal generation sections 23 and 24, H-VALID generation sections 25 and 26, INDEX SEARCH generation sections 27 and 28, a synthesis section 29, and a counter 30.

On the basis of a control signal inputted from the control section 60, the delay line 21 adjusts a phase of the pixel clock PXLCLK inputted from the clock generation section 40 and outputs the phase-adjusted pixel clock PXLCLK1. On the basis of a control signal inputted from the control section 60, the delay line 22 adjusts the phase of the pixel clock PXLCLK inputted from the clock generation section 40 and outputs the phase-adjusted pixel clock PXLCLK2. Delay lines which exercise delay control to a precision of, for example, one thirty-second of a pixel can be used as the delay lines 21 and 22, but delay resolution may be set properly. The delay lines 21 and 22 may be formed outside the ASIC 20.

The INDEX signal generation section 23 receives the signal INDEX inputted from the light receiving sensor 19 and outputs an index signal SIND1 which is in synchronization with the pixel clock PXLCLK1. The INDEX signal generation section 24 receives the signal INDEX inputted from the light receiving sensor 19 and outputs an index signal SIND2 which is in synchronization with the pixel clock PXLCLK2. The timing at which the index signals SIND1 and SIND2 are outputted is adjusted by the control section 60. As shown in FIG. 1, if there is a deviation of one pixel in the main scanning direction between the positions of the first laser light source 11A and the second laser light source 11B, then there is a timing lag corresponding to one pixel between the clock timing at which the index signal SIND1 is outputted and the clock timing at which the index signal SIND2 is outputted. In this embodiment, a timing adjustment is performed on the INDEX signal generation section 24 with the INDEX signal generation section 23 as a reference.

The H-VALID generation section 25 receives the index signal SIND1 inputted and outputs an image area signal H-VALID1 indicative of an effective image area in the main scanning direction to a drive circuit in the light source unit 11. The H-VALID generation section 26 receives the index signal SIND2 inputted and outputs an image area signal H-VALID2 indicative of an effective image area in the main scanning direction to the drive circuit in the light source unit 11. The outputtings of the image area signals H-VALID1 and H-VALID2 are begun after a lapse of clocks corresponding to a predetermined number of pixels after the index signal SIND1 and SIND2 are inputted, respectively (see "F" to "I" in FIG. 6). In this case, "the predetermined number of pixels" for the first laser light source 11A may differ from that for the second laser light source 11B.

At start time the INDEX SEARCH generation section 27 outputs an index search signal LD1SRH, being a forced light emitting signal, to the drive circuit in the light source unit 11 with input from the control section 60 as a trigger. After the start the INDEX SEARCH generation section 27 outputs the index search signal LD1SRH, being a forced light emitting signal, to the drive circuit in the light source unit 11 with the index signal SIND1 inputted as a trigger. At start time the INDEX SEARCH generation section 28 outputs an index search signal LD2SRH, being a forced light emitting signal, to the drive circuit in the light source unit 11 with input from the control section 60 as a trigger. After the start the INDEX SEARCH generation section 28 outputs the index search signal LD2SRH, being a forced light emitting signal, to the drive circuit in the light source unit 11 with the index signal SIND2 inputted as a trigger.

The synthesis section 29 includes an OR circuit. The synthesis section 29 receives the index signals SIND1 and SIND2 inputted and outputs a composite index signal LDIND to the counter 30.

On the basis of the count clock LDCLK inputted from the clock generation section 50, the counter 30 measures (counts) time intervals t1, t1', t2, t2', . . . between leading edges of the composite index signal LDIND (see "H" in FIG. 5) and outputs count values to the control section 60. These count values are stored in order in a random access memory (RAM) in the control section 60.

The control section 60 includes a central processing unit (CPU), a read only memory (ROM), the random access memory (RAM), etc. The CPU operates in accordance with a program stored in the ROM and gives the ASIC 20 instructions to start measure mode (in which an error between the index signals SIND1 and SIND2 is detected) or image write mode.

In addition, the CPU reads out the count values stored in the RAM and calculates error $\Delta_{12}$ between the index signals SIND1 and SIND2 given by the following equation (1).

$$\Delta_{12} = \left\{ \frac{t_1 - t'_1}{2} + \frac{t_2 - t'_2}{2} + \ldots + \frac{t_n - t'_n}{2} \right\} / n \quad (1)$$

The CPU then divides the amount of a correction to cancel out the error $\Delta_{12}$ into two components. One component is greater than or equal to one pixel clock and the other component is smaller than one pixel clock. To cancel out the component greater than or equal to one pixel clock, the CPU adjusts the timing at which the INDEX signal generation sections 23 and 24 output the index signals SIND1 and SIND2, respectively, or adjusts the timing at which the H-VALID generation sections 25 and 26 output the image area signals H-VALID1 and H-VALID2, respectively. To cancel out the component smaller than one pixel clock, the CPU controls the phases (amounts of delays) of the pixel clocks PXLCLK1 and PXLCLK2 on the delay lines 21 and 22, respectively.

Operation performed in this embodiment will now be described.

The operation of the control circuit in the measure mode will be described first with reference to a timing chart shown in FIG. 5.

In a period corresponding to a scanning line, first the INDEX SEARCH generation section 27 generates the index search signal LD1SRH ("A" in FIG. 5) by the trigger input from the control section 60. The first laser light source 11A, being a reference light source, is turned on by the index search signal LD1SRH and the optical signal INDEX1 ("B" in FIG. 5) is generated. The light receiving sensor 19 receives the optical signal INDEX1 and generates the index signal INDEX ("E" in FIG. 5).

On the basis of the pixel clock PXLCLK2, the INDEX signal generation section 24 generates the synchronized index signal SIND2 ("G" in FIG. 5) at timing delayed by pixel clocks the number of which is the same as that of pixels corresponding to the angle θ at which the first laser light source 11A and the second laser light source 11B are arranged to the sub-scanning direction (electrical correction).

The synthesis section 29 generates the composite index signal LDIND ("H" in FIG. 5) by using the index signal SIND2. The composite index signal LDIND is inputted to the counter 30. The counter 30 begins counting operation. As a result, the timing of the synchronized index signal SIND2 the timing of which is to be adjusted is obtained on the basis of the first laser light source 11A, being a reference light source. The index signal SIND2 is also inputted to the INDEX SEARCH generation section 28 and is used for generating the index search signal LD2SRH in the next scanning line.

In a period corresponding to the next scanning line, first the INDEX SEARCH generation section 28 generates the index search signal LD2SRH ("C" in FIG. 5) with the index signal SIND2 as a trigger. As a result, the second laser light source 11B, being a light source the timing of which is to be adjusted, is turned on and the optical signal INDEX2 ("D" in FIG. 5) is generated. The light receiving sensor 19 receives the optical signal INDEX2 and generates the index signal INDEX ("E" in FIG. 5). There is a lag corresponding to the actual inclination θ between the timing at which the light receiving sensor 19 receives the optical signal INDEX2 and the timing at which the light receiving sensor 19 received the optical signal INDEX1 in the period corresponding to the preceding scanning line. Therefore, there is also a lag corresponding to the actual inclination θ in the timing at which the light receiving sensor 19 generates the index signal INDEX.

The index signal INDEX is inputted to the INDEX signal generation section 23 on the reference side. The INDEX signal generation section 23 generates the index signal SIND1 ("F" in FIG. 5) at the timing which is synchronized with the pixel clock PXLCLK1. The synthesis section 29 generates the composite index signal LDIND ("H" in FIG. 5) by using the index signal SIND1. The composite index signal LDIND is inputted to the counter 30. As a result, the timing of the synchronized index signal SIND1 is obtained from the INDEX signal generation section 23 on the reference side on the basis of the second laser light source 11B, being a light source the timing of which is to be adjusted.

The counter 30 terminates the counting operation begun in the period corresponding to the preceding scanning line and newly begins counting operation. The index signal SIND1 is also inputted to the INDEX SEARCH generation section 27 and is used for generating the index search signal LD1SRH in the next scanning line.

By repeating this operation, the counter 30 measures (counts) the time intervals t1, t1', t2, t2', . . . between leading edges of the composite index signal LDIND. These count values are stored in order in the RAM in the control section 60.

The above-mentioned repetitive process is programmed into the ASIC 20 as a module function, so there is no need to input a trigger from the CPU each time the process is repeated. If a polygon mirror having, for example, an even number of mirror surfaces is used as a scanner and the above-mentioned repetitive process is simply performed, the first laser light source 11A is scanned only by the odd mirror surfaces of the polygon mirror and the second laser light source 11B is scanned only by the even mirror surfaces of the polygon mirror. However, the first laser light source 11A may be used twice in succession to perform an index search. Such an irregular process is also programmed into the ASIC 20 as a module function. By doing so, each laser light source is scanned by all of the mirror surfaces of the polygon mirror. Therefore, errors in the mirror surfaces themselves of the polygon mirror can also be adjusted.

When the capacity of the RAM is exhausted by storing count values outputted from the counter 30, the above-mentioned repetitive process terminates. The CPU reads out these count values from the RAM and calculates the error $\Delta_{12}$ between the index signals SIND1 and SIND2. If the amount of a delay corresponding to the actual inclination θ is identical to the amount of a delay (delay time) of the index signal SIND2 in respect to the index signal SIND1, then the error $\Delta_{12}$ is zero.

The count clock LDCLK at a low frequency may be supplied to the counter 30. For example, the frequency of the count clock LDCLK may be lower than that of the pixel clock. It is preferable from the viewpoint of power consumption that the count clock LDCLK at such a low frequency is preferably used. In this case, error adjustment can be performed with desired precision by increasing the number of count value samples, that is to say, by setting the capacity of the RAM to a great value in the above example. As a result, however, it takes a long time to perform error adjustment. To complete error adjustment in a short period of time, the count clock LDCLK at a high frequency is preferably used.

When the CPU calculates the error $\Delta_{12}$ between the index signals SIND1 and SIND2, the CPU divides the amount of a correction to cancel out this error into two components. One component is greater than or equal to one pixel clock and the other component is smaller than one pixel clock. To cancel out the component greater than or equal to one pixel clock, the CPU adjusts the timing at which the INDEX signal generation section 24 outputs the index signal SIND2 or adjusts the timing at which the H-VALID generation section 26 outputs the image area signal H-VALID2. To cancel out the component smaller than one pixel clock, the CPU adjusts the phases of the pixel clocks PXLCLK1 and PXLCLK2 by controlling the amounts of delays on the delay lines 21 and 22.

Figure 5:
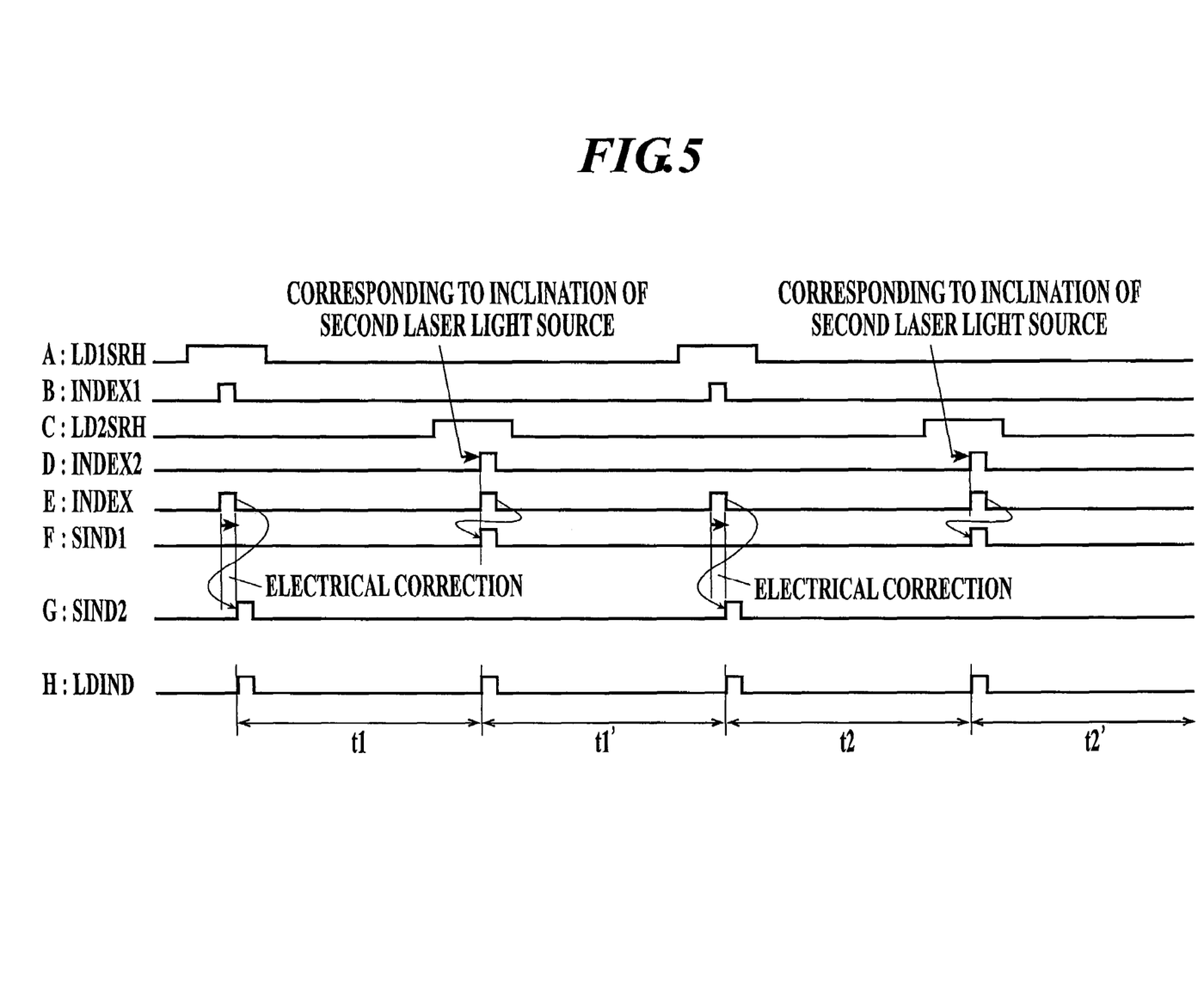
FIG. 5 is a view showing a timing chart of the control circuit in measure mode.

The operation in the measure mode shown in FIG. 5 is performed when the image formation apparatus 100 is shipped from a factory or when power is applied to the image formation apparatus 100. The above operation may be performed for each printing process, each page, or each line after power is applied to the image formation apparatus 100.

Figure 6:
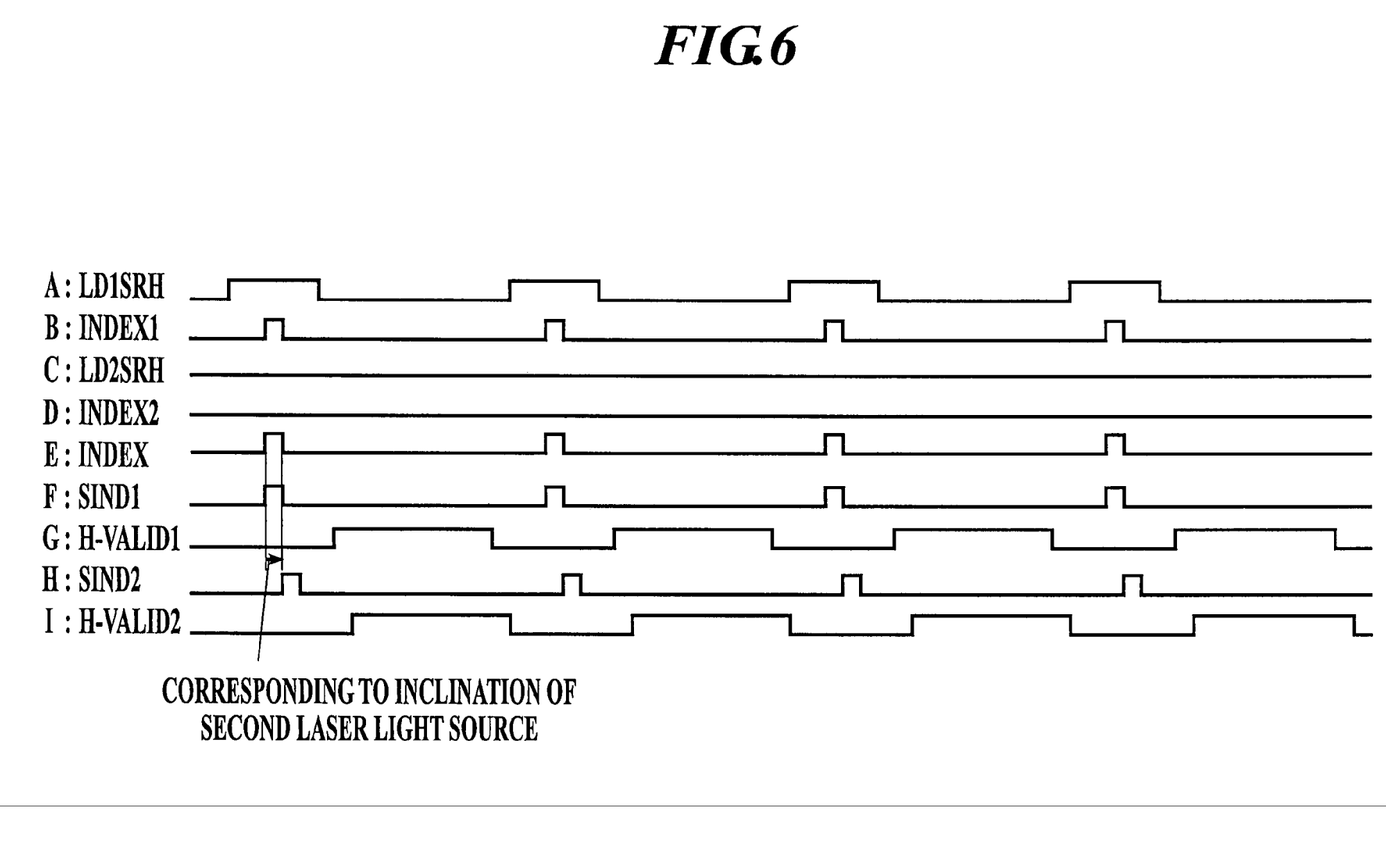
FIG. 6 is a view showing a timing chart of the control circuit at image recording time.

A timing chart in FIG. 6 shows an example of the operation of the control circuit at the time of actually recording an image after the error correction. In this example, the optical signal INDEX1 ("B" in FIG. 6) is used for exercising index control on the first laser light source 11A and the second laser light source 11B. To cancel out an error component greater than or equal to one pixel clock, the CPU adjusts the timing at which the INDEX signal generation section 24 outputs the index signal SIND2 ("H" in FIG. 6). To cancel out an error component smaller than one pixel clock, the CPU controls the phases of the pixel clocks PXLCLK1 and PXLCLK2.

As has been described in the foregoing, in this embodiment the quality of an image can be improved by achieving adjustment of light emitting timings so as to correspond to the physical relative positions of the first laser light source 11A and the second laser light source 11B. Moreover, a deviation in the main scanning direction between beam spots of a plurality of the first laser light source 11A and the second laser light source 11B can easily be detected electronically. As a result, the efficiency of a detection process can be improved.

In addition, the number of count value samples for calculating the error $\Delta_{12}$ between the index signals SIND1 and SIND2 increases with an increase in the number of times the repetitive process programmed into the ASIC 20 is performed. As a result, the timings at which the light source unit 11 emit lights can be adjusted with high precision. If many samples are used, a clock at a frequency which gives low precision can be used as the count clock LDCLK. This reduces power consumed by the clock generation section 50.

Furthermore, an error component smaller than one pixel clock can finely be adjusted by controlling the amounts of delays on the delay lines 21 and 22. This improves the quality of an output image further. In addition, an error component greater than or equal to one pixel clock can easily be adjusted by controlling the timing at which the INDEX signal generation sections 23 and 24 output the signals or the timing at which the H-VALID generation sections 25 and 26 output the signals. As a result, adjustment can be performed widely.

Moreover, in this embodiment the relative timing at which the first laser light source 11A and the second laser light source 11B emit light is adjusted by using a photosensor included in an ordinary laser scanning optical apparatus, so there is no need to use a special sensor. This is advantageous from the viewpoint of production costs.

In this embodiment the light source unit 11 of a two-beam type is used. However, a light source of a four- or eight-beam type may be used. In this case, it is assumed that the linearity of the light sources in the light source unit 11 is secured, and actual sampling can be performed by using laser light sources located at both ends.

In addition, the inclination itself of the semiconductor laser unit used as the light source unit 11 may be adjusted as feedback for canceling out the error $\Delta_{12}$ between the index signals SIND1 and SIND2. For example, the light source unit 11 itself is located so that it can be rotated. The angle at which the light source unit 11 is located is adjusted by, for example, a stepping motor controlled by a signal from the CPU.

The present application is based on the entire disclosure, including the specification, claims, drawings, and abstract, of Japanese Patent Application No. Tokugan 2005-131573 filed with Japan Patent Office on Apr. 28, 2005.

What is claimed is:

1. In an image formation apparatus which comprises a plurality of laser light sources including a first laser light source and a second laser light source, a scanner for scanning laser lights emitted from the plurality of laser light sources in a main scanning direction, and a light receiving sensor for receiving the laser lights deflected and scanned by the scanner, a method for adjusting timings at which the first laser light source and the second laser light source emit lights comprising:

a first generation process for making the first laser light source emit light in a first scanning period in which scanning is performed by the scanner, and for generating a first signal which is in synchronization with a pixel clock for the second laser light source based on an output from the light receiving sensor obtained in the first scanning period;

a second generation process for making the second laser light source emit light in a second scanning period after the first scanning period, and for generating a second signal which is in synchronization with a pixel clock for the first laser light source based on an output from the light receiving sensor obtained in the second scanning period;

a third generation process for making the second laser light source emit light in a third scanning period in which scanning is performed by the scanner, and for generating a third signal which is in synchronization with the pixel clock for the first laser light source based on an output from the light receiving sensor obtained in the third scanning period;

a fourth generation process for making the first laser light source emit light in a fourth scanning period after the third scanning period, and for generating a fourth signal which is in synchronization with the pixel clock for the second laser light source based on an output from the light receiving sensor obtained in the fourth scanning period; and an adjustment process for adjusting, based on a time interval between the first signal and the second signal and a time interval between the third signal and the fourth signal, a relationship between timings at which the first laser light source and the second laser light source emit lights.

2. The method of claim 1, wherein:

the second scanning period is identical to the third scanning period; and the output from the light receiving sensor obtained in the second scanning period is identical to the output from the light receiving sensor obtained in the third scanning period, thus the second signal is identical to the third signal.

3. The method of claim 1, wherein:

each of the first generation process through the fourth generation process is performed a plurality of times; and in the adjustment process, the relationship is adjusted based on a plurality of time intervals obtained from a plurality of the first signals and a plurality of the second signals and a plurality of time intervals obtained from a plurality of the third signals and a plurality of the fourth signals.

4. The method of claim 3, wherein, in the adjustment process, the plurality of time intervals obtained from the plurality of first signals and the plurality of second signals and the plurality of time intervals obtained from the plurality of third signals and the plurality of fourth signals are obtained based on a clock signals having a clock frequency lower than that of the pixel clock.

5. The method of claim 1, wherein, in the adjustment process, with respect to at least one of the pixel clock for the first laser light source and the pixel clock for the second laser light source, a phase thereof is adjusted.

6. The method of claim 1, wherein, in the adjustment process, at least one of a number of delay clock used for beginning to write an image by using the first laser light source and a number of delay clock used for beginning to write an image by using the second laser light source is adjusted.

7. The method of claim 1, wherein:

the second laser light source is placed so as to be shifted in the main scanning direction in an amount of a predetermined number of pixel(s) from the first laser light source;

in the first generation process, a delay of pixel clock corresponding to the predetermined number of pixel(s) is produced when the first signal is generated based on the output from the light receiving sensor obtained in the first scanning period; and in the fourth generation process, a delay of pixel clock corresponding to the predetermined number of pixel(s) is produced when the fourth signal is generated based on the output from the light receiving sensor obtained in the fourth scanning period.

8. A laser scanning apparatus comprising:

a plurality of laser light sources including a first laser light source and a second laser light source;

a scanner for scanning laser lights emitted from the plurality of laser light sources in a main scanning direction;

a light receiving sensor for receiving the laser lights deflected and scanned by the scanner; and a signal generation unit for generating a first signal which is in synchronization with a pixel clock for the second laser light source based on an output from the light receiving sensor obtained by the laser light emitted from the first laser light source, and for generating a second signal which is in synchronization with a pixel clock for the first laser light source based on an output from the light receiving sensor obtained by the laser light emitted from the second laser light source.

9. The apparatus of claim 8, further comprising a control unit for adjusting a relationship between timings at which the first laser light source and the second laser light source emit lights based on the first signal and the second signal.

10. The apparatus of claim 8, wherein the signal generation unit:

generates the first signal based on an output from the light receiving sensor obtained by making the first laser light source emit light in a first scanning period in which scanning is performed by the scanner; and generates the second signal based on an output from the light receiving sensor obtained by making the second laser light source emit light in a second scanning period after the first scanning period.

11. The apparatus of claim 10, further comprising a determination unit for determining a time-interval between the first signal and the second signal.

12. The apparatus of claim 8, wherein:

the second laser light source is placed so as to be shifted in the main scanning direction in an amount of a predetermined number of pixel(s) from the first laser light source and the second laser light source; and when the signal generation unit generates the first signal, the signal generation unit produces a delay of pixel clock corresponding to the predetermined number of pixel(s).

13. An image formation apparatus including the laser scanning apparatus of claim 8.

* * * * *